(12) United States Patent
Caddy

(10) Patent No.: US 6,718,767 B1
(45) Date of Patent: Apr. 13, 2004

(54) VARIABLE GEOMETRY TURBOCHARGER CONTROL SYSTEM

(75) Inventor: Stephen W. Caddy, Huddersfield (GB)

(73) Assignee: Holset Engineering Company Ltd., Huddersfield (GB)

( * ) Notice: Subject to any disclaimer, the term of this patent is extended or adjusted under 35 U.S.C. 154(b) by 0 days.

(21) Appl. No.: 09/194,460
(22) PCT Filed: May 23, 1997
(86) PCT No.: PCT/GB97/01419
§ 371 (c)(1),
(2), (4) Date: Dec. 6, 1999
(87) PCT Pub. No.: WO97/45633
PCT Pub. Date: Dec. 4, 1997

(30) Foreign Application Priority Data

May 25, 1996 (GB) .................................. 9611015

(51) Int. Cl.⁷ .............................................. F02B 37/22
(52) U.S. Cl. ................................................... 60/602
(58) Field of Search .............................. 60/602, 600

(56) References Cited

U.S. PATENT DOCUMENTS

| | | | |
|---|---|---|---|
| 4,671,068 A | 6/1987 | Moody et al. | 60/602 |
| 5,123,246 A | 6/1992 | Younessi et al. | 60/602 |
| 5,228,292 A | 7/1993 | Hanauer et al. | 60/602 |
| 5,440,879 A | 8/1995 | Dellora | 60/602 |
| 5,442,918 A | 8/1995 | Baeuerle et al. | 60/602 |
| 6,000,221 A | 12/1999 | Church et al. | 60/602 |

FOREIGN PATENT DOCUMENTS

| DE | 195 31 871 | 11/1996 |
|---|---|---|
| DE | 3731320 A1 * | 4/1998 |

* cited by examiner

Primary Examiner—Michael Koczo
(74) Attorney, Agent, or Firm—Gary M. Gron

(57) ABSTRACT

A control system for a variable geometry turbocharger having a turbine driven by exhaust gas delivered to an exhaust gas inlet of the turbocharger from an engine exhaust manifold and a compressor driven by the turbine to deliver air to an engine intake manifold via an air outlet of the turbocharger. The differential pressure across the engine is monitored, and a closed loop control system adjusts the variable geometry mechanism to prevent the differential pressure exceeding a predetermined limit. In engine braking mode the variable geometry mechanism may be actuated by a signal representative of the exhaust manifold pressure. An override circuit may be provided to control the variable geometry mechanism in the event of the turbocharger rpm exceeding a predetermined limit.

8 Claims, 2 Drawing Sheets

VARIABLE GEOMETRY TURBOCHARGER CONTROL SYSTEM

TECHNICAL FIELD

The present invention relates to a control system for a variable geometry turbocharger.

BACKGROUND OF THE INVENTION

Turbochargers comprise a turbine driven by exhaust gas delivered to an exhaust gas inlet of the turbocharger from an engine exhaust manifold. The turbine drives a compressor which delivers air to an engine intake manifold via an air outlet of the turbocharger. In a variable geometry turbocharger, physically displaceable components are located in the exhaust gas inlet of the turbocharger so that the geometry of the inlet can be adjusted to control the exhaust gas pressure upstream of the turbine and the speed at which the exhaust gas flows through the turbine. This in turn affects the speed of rotation of the turbine, and hence the speed of rotation of the associated compressor. Generally variable geometry mechanisms in turbochargers are displaced in order to appropriately modulate the intake manifold pressure of the engine to optimize engine running conditions.

Electronic variable geometry turbocharger control devices are known which receive input signals representing different engine operation parameters and generate a control signal which is used to control an actuator which in turn controls the geometry of the variable mechanism so as to achieve desired running conditions. Most of the known control devices are designed to maintain a desired engine intake manifold pressure or density as a function of engine speed and fuel rate. The control signal may also be modified to take into account for example ambient temperature and pressure, charge air temperature, turbocharger rotational speed and throttle demand.

The known devices may define closed loop control systems in which a control signal is generated by comparing a direct measurement of the intake manifold pressure with a desired value of this parameter, or by comparing a calculated actual inlet manifold density with a desired value of this parameter. The magnitude of the difference revealed by the comparison is used to derive a control signal which determines the displacement of the variable geometry mechanism. Such devices are satisfactory for steady or quasi-steady state operation, but do not operate well in rapidly changing transient conditions. For example, if there is a sudden increase in the demanded intake manifold pressure, perhaps as a result of a large change in power demand, the natural action of the control device is to drive the control signal in such a way as to reduce the turbine inlet area in order to increase intake manifold pressure and density. If the system has been calibrated for fast response, the variable geometry mechanism will probably reduce the turbine area to a minimum value very rapidly in order to increase the intake manifold pressure and density as rapidly as possible, before increasing the turbine area again to some new quasi-steady state area as the new desired intake manifold pressure and density is approached. Unfortunately, as the turbine area is reduced during the initial phase of a transient change in conditions, the exhaust manifold pressure rises much more rapidly than the intake manifold pressure as a result of the different time constants of the exhaust and intake systems. If this effect is not properly regulated, the end result is a large negative pressure differential across the engine, that is between the engine intake manifold and the engine exhaust manifold, and this causes a large reduction in engine volumetric efficiency. This results in the mass flow of air into the engine reducing in spite of the increased inlet manifold pressure. Thus, even though the rate of rise of the intake manifold pressure may have been very rapid, the ability of the engine to accept load will have been reduced. To the driver of the engine this is detected as a loss of performance and an increase in smoke emissions. In addition, transient very high exhaust manifold pressures may be generated, which can adversely affect the engine.

The above problem of an unduly rapid exhaust manifold pressure rise is avoided in the known control systems by limiting the rate of rise of the exhaust manifold pressure. This may be achieved by limiting the response rate of the control device, or by limiting the minimum turbine area to a relatively large value; for example, by imposing a physical limitation within the turbine or by imposing limit values on the control signal generated by the control system. These solutions to the problem compromise the transient performance of the engine and turbocharger. They are also susceptible to large errors because they are open loop systems in which no information related to the actual engine volumetric efficiency is fed back into the control loop. In addition, extra margins have to be added to allow for production variations, ambient pressure and temperature variations, and lifetime variations in the performance of the engine and turbocharger. All of these factors compromise performance.

It is also known for variable geometry turbochargers to modulate the engine braking power by acting on the exhaust flow; for example, by restricting the exhaust flow. The known engine braking control systems monitor several input signals. representative of engine operating parameters and generate a control signal which is applied to an actuator of the variable geometry mechanism so as to achieve the desired braking power. The known systems are open loop, however, as no direct measurement of braking power is fed back to the controller. It is possible to cause damage to the engine if the variable geometry mechanism restricts the turbine inlet area too much so that an excessive exhaust manifold pressure is generated. Therefore current braking control devices using open loop control are always designed with wide safety margins to account for production variations, ambient pressure and temperature variations, and lifetime variations in the performance of the engine and turbocharger. The result of all these constraints is that engine braking power is significantly reduced as compared with what is potentially available.

It is an object of the present invention to provide a variable geometry turbocharger control system which obviates or mitigates the problems outlined above.

SUMMARY OF THE INVENTION

According to the present invention, there is provided a control system for a variable geometry turbocharger having a turbine driven by exhaust gas delivered to an exhaust gas inlet of the turbocharger from an engine exhaust manifold and a compressor driven by the turbine to deliver air to an engine intake manifold via an air outlet of the turbocharger, comprising means for monitoring a parameter which is a function of the pressure within the engine exhaust manifold, and closed loop control means for controlling the displacement of a variable geometry mechanism located upstream of the turbine to maintain the monitored parameter within predetermined limits.

The monitored parameter may be a function of the density of the gas within the exhaust gas manifold, or of the pressure within the engine exhaust manifold, but is preferably related to the difference between the pressures within the engine exhaust manifold and the engine intake manifold. For example, the monitored parameter may correspond to the difference between the pressures within the engine exhaust manifold and the engine intake manifold divided by either the pressure within the engine exhaust manifold or the pressure within the engine intake manifold.

The predetermined limit may be fixed, or may be derived from the engine operation conditions; for example, engine speed and fuel rate.

A switch may be provided to select either a first control signal intended to control the variable geometry mechanism to maintain a desired engine intake manifold pressure or density, or a second control signal intended to control a variable geometry mechanism to maintain the monitored parameter within the predetermined limits. The switch may be controlled in dependence upon whether or not the second signal exceeds the predetermined limits. The selection of either the first or second control signals may be overridden by a third control signal intended to reduce turbocharger speed if the turbocharger speed exceeds a predetermined limit, or by a fourth control signal intended to control the variable geometry mechanism to provide a desired exhaust manifold pressure during engine braking when the engine is in braking mode.

The invention provides closed loop control of engine volumetric efficiency which enables the optimization of engine performance through transient operating conditions and an appropriate response to transient conditions. In addition, when the system is operating in braking mode, the exhaust pressure can be used as a feedback signal to achieve optimized braking performance. Adverse effects on the engine can be avoided under all conditions. Thus the transient response of the engine and the engine braking power may be maximized without exceeding safety limits. The system also compensates for production variations, ambient pressure and temperature variations, and lifetime variations in the performance of the engine and turbocharger.

SUMMARY OF THE DRAWINGS

An embodiment of the present invention will now be described, by way of example, with reference to the accompanying drawings, in which.

DESCRIPTION OF THE PREFERRED EMBODIMENT

Figure 1:
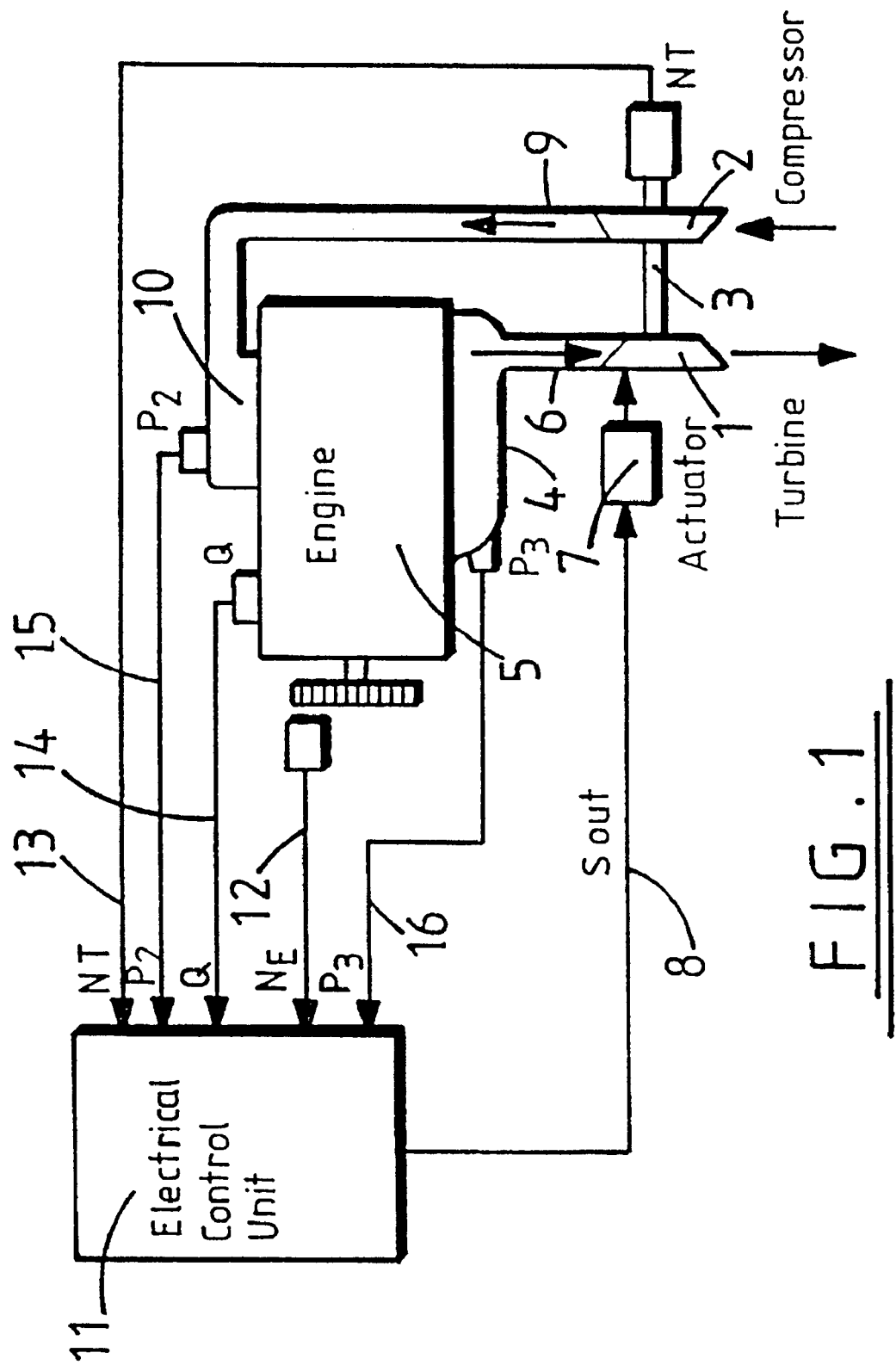
FIG. 1 is a schematic illustration of the general arrangement of an engine, turbocharger and control system in accordance with the present invention.

Referring to FIG. 1, the schematically illustrated arrangement comprises a turbocharger having a turbine wheel 1 and a compressor wheel 2 mounted on a common shaft 3. A variable geometry mechanism (not shown) is mounted adjacent the turbine 1. The invention is applicable to many different types of variable geometry turbocharger mechanisms; for example, that described in published European patent specification No. 0342889. Whatever sort of variable geometry mechanism is used, in essence it is a displaceable mechanism located upstream of the turbine 1 to vary the flow area and thus velocity of a flow of exhaust gas which flows from an exhaust manifold 4 of an engine 5 via an exhaust gas inlet 6 of the turbocharger. The variable geometry mechanism is displaceable by an actuator 7 controlled by a control signal $S_{out}$ on line 8, the displacement of the variable geometry mechanism determining the pressure within the inlet 6, and hence within the exhaust manifold 4, and the speed of the exhaust gas which impinges upon the turbine 1. The compressor wheel 2 drives ambient air through an air outlet 9 of the turbocharger to an engine intake manifold 10.

The control signal $S_{out}$ is generated by an electronic control unit 11 which receives an input $N_E$ on line 12 which is representative of engine rpm, an input $N_T$ on line 13 which is indicative of the rpm of the compressor wheel 2, an input Q on line 14 which is indicative of the rate at which fuel is being delivered to the engine, an input $P_2$ on line 15 which is indicative of the pressure within the engine intake manifold, and an input $P_3$ on line 16 which is indicative of the pressure in the engine exhaust manifold. The signal $S_{out}$ is dependent upon the five input signals as described in greater detail with reference to FIG. 2.

Figure 2:
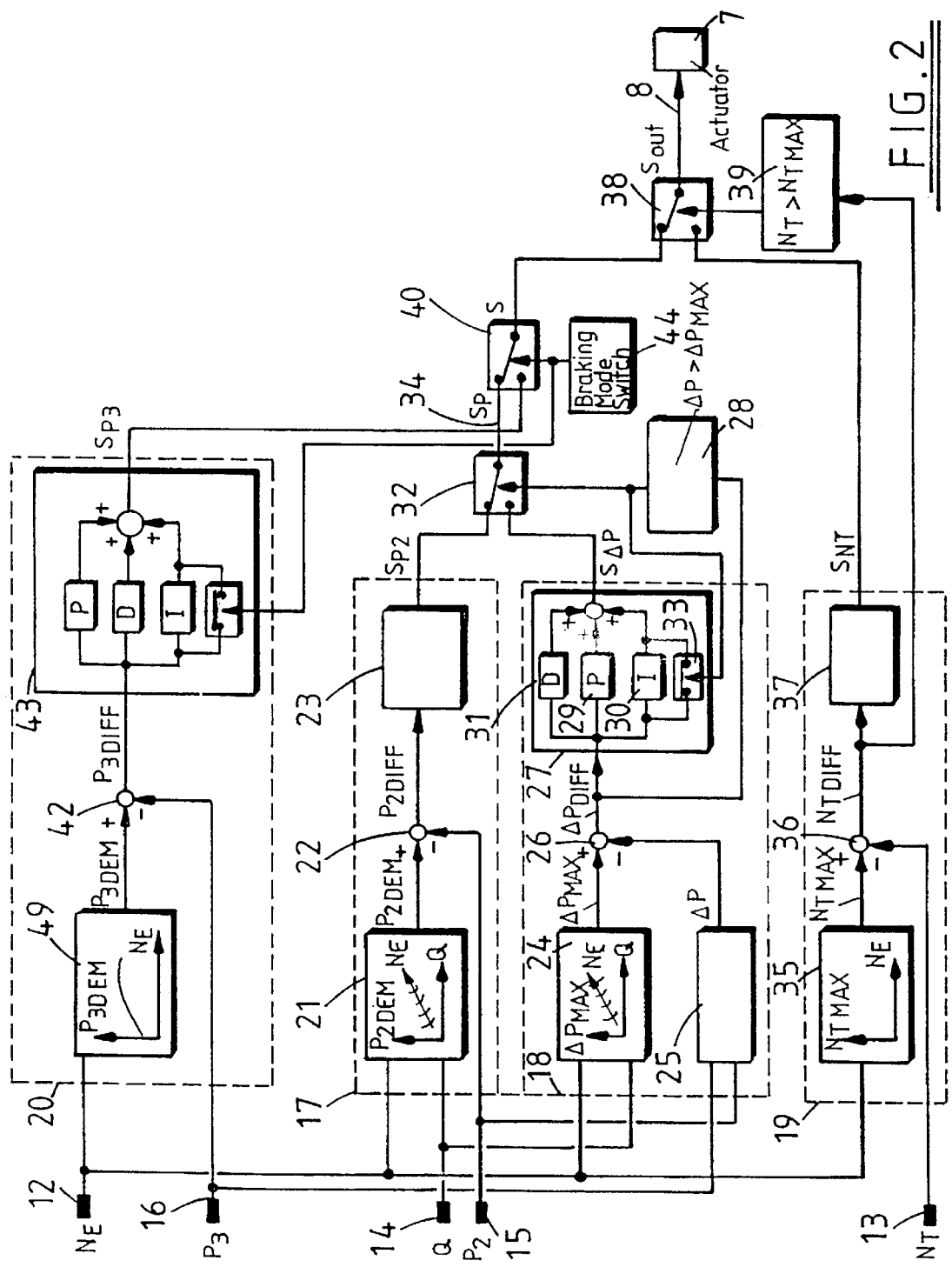
FIG. 2 schematically represents the functional elements of the control system of FIG. 1.

Referring to FIG. 2, the electronic control unit comprises four sub-circuits 17, 18, 19 and 20. As described in greater detail below, the sub-circuit 17 is a conventional circuit which produces a first control signal output $S_{P2}$ which is related to the intake manifold pressure $P_2$. Circuit 18 produces a second control signal $S_{\Delta P}$ which acts to limit the pressure differential across the engine when negative; that is the pressure differential between the intake manifold pressure $P_2$ and the exhaust manifold pressure $P_3$. The circuit 19 produces a third control signal $S_{NT}$ which acts to limit the maximum rpm of the turbocharger. Circuit 20 produces a forth control signal $S_{P3}$ which controls the actuator 7 when the system is in braking mode.

Circuit 17 receives as inputs the engine speed signal $N_E$ and the fuel rate signal Q. These inputs address a look-up table schematically represented by box 21 to produce an output $P_{2DEM}$ representative of the desired intake manifold pressure. This signal is compared in a comparator 22 with the intake manifold pressure $P_2$, and the comparator 22 produces the difference output $P_{2DIFF}$. That difference output is applied to a signal conditioning circuit 23, the output of which is the first control signal $S_{P2}$. The first sub-circuit 17 is of conventional form and in a conventional system the output $S_{P2}$ would be directly applied to the actuator 7 so as to control the variable geometry mechanism.

The circuit 18 receives as inputs the engine rpm signal $N_E$, the fuelling quantity input Q, the intake manifold pressure signal $P_2$ and the exhaust manifold pressure signal $P_3$. The engine rpm and fuel rate signals address a look-up table represented by box 24 the output $\Delta P_{MAX}$ of which represents the maximum pressure differential which can be allowed without the volumetric efficiency of the engine being unduly reduced; that is reduced to an extent which would result in an unacceptable transient performance response. A comparator 25 produces an output $\Delta_P$ representing the difference between the intake manifold pressure $P_2$ and the exhaust manifold pressure $P_3$. The signals $\Delta P_{MAX}$ and $\Delta P$ are applied to a comparator 26 which produces an output $\Delta P_{DIFF}$ that is applied to a conventional PID circuit 27 and to a switch control circuit 28. The circuit 27 processes the difference value $\Delta P_{DIFF}$ in a proportional term sub-circuit 29, an integral term sub-circuit 30, and a differential term sub-circuit 31. The outputs of these three sub-circuits are summed to produce the second control signal $S_{\Delta P}$. The circuit 28 controls a switch 32 and a switch 33. The switch 32 selects either the output of the sub-circuit 17 or the output of the sub-circuit 18 to form a signal $S_P$ on line 34. The switch 33 is provided in parallel with the integrator sub-circuit 30 to prevent integrator saturation when the switch 32 selects the output of the sub-circuit 17. The controller 28 connects the output of the sub-circuit 17 to the line 34 except when the signal $\Delta P$ is greater than the signal $\Delta P_{MAX}$, that is except when $\Delta P_{DIFF}$ is negative. Accordingly the output signal $S_P$ corresponds to the output $S_{P2}$ of sub-circuit 17 during normal steady state operation but is switched to the output $S_{\Delta P}$ in the event of the pressure differential across the engine exceeding the predetermined limit represented by $\Delta P_{MAX}$.

The sub-circuit 19 is a conventional turbocharger rpm governor and receives the inputs $N_E$ and $N_T$. A look-up table represented by box 35 is addressed by the engine rpm signal $N_E$ to produce an output $N_{TMAX}$ which is applied to a comparator 36. The other input to the comparator 36 is the signal $N_T$ such that the output $N_{TDIFF}$ of the comparator 36 represents the difference between the actual turbocharger rpm and the maximum desired turbocharger rpm. A signal conditioning circuit 37 produces a third control signal $S_{NT}$ which is applied to a switch 38 controlled by a controller 39 responsive to the output $N_{TDIFF}$ of the comparator 36. The switch 38 assumes the condition shown unless $N_T$ is greater than $N_{TMAX}$, that is unless $N_{TDIFF}$ is negative.

The fourth sub-circuit 20 provides a fourth control signal output $S_{P3}$, which is one input to a switch 40. The other input to the switch 40 is the signal $S_P$ output from the switch 32. The circuit 20 incorporates a look-up table represented by box 41 which is addressed by the engine rpm signal $N_E$ to produce an output $P_{3DEM}$ to a comparator 42. The comparator 42 also receives the exhaust manifold pressure signal $P_3$ and produces an output $P_{3DIFF}$ which is applied to a PID controller 43. The operation of the circuit 43 is similar to that of the controller 27 and will not be described further. The desired exhaust manifold pressure represented by the signal $P_{3DEM}$ is predetermined to give the desired engine braking power without any safety limits of the engine being exceeded. The PID controller 43 ensures that the output $S_{P3}$ when switched through to the actuator 7 is appropriate to limit the exhaust manifold pressure during braking to the signal $P_{3DEM}$. When the engine is firing, the output signal $S_{P3}$ is isolated by the switch 40 and does not contribute to the overall control system. When the engine is in braking mode, this is detected by a controller 44 which actuates the switch 40 so as to transfer the signal $S_{P3}$ through to the switch 38.

Thus, the output signal $S_{out}$ applied to the actuator 7 corresponds to the signal $S_{NT}$ if the turbocharger rpm limit is exceeded. If the turbocharger rpm limit is not exceeded, but the engine is in braking mode, the output signal $S_{out}$ corresponds to the signal $S_{P3}$ from the fourth sub-circuit 20. If the turbocharger rpm limit is not exceeded and the engine is not in braking mode, then the output signal $S_{out}$ corresponds to the output signal $S_{P2}$ of the sub-circuit 17 unless the pressure differential exceeds a predetermined limit, in which case the output signal $S_{out}$ corresponds to the output signal $S_{\Delta P}$ from sub-circuit 18.

Although in FIG. 1 five engine condition parameters are monitored, additional sensors may be provided to monitor additional parameters; for example, ambient pressure and temperature, intake manifold temperature, and vehicle road speed. The ambient pressure and temperature and intake manifold temperature may be sensed to improve the performance of the first sub-circuit 17. The road speed may be monitored to improve the performance of the engine braking sub-circuit 20. The PID controllers 27 and 43 as shown in FIG. 2 may be replaced by alternative standard processing circuits.

The value $\Delta P$ representing the differential pressure across the engine may be calculated in a variety of different ways. For example the value $\Delta P$ may be taken to correspond simply to the exhaust manifold pressure; that is $\Delta P = P_3$. Alternatively the value $\Delta P$ may be taken to be simply the difference between the exhaust manifold pressure and the intake of manifold pressure; that is either $P_3 - P_2$ or $P_2 - P_3$. Alternatively, the value $\Delta P$ may be taken to be the difference between the exhaust manifold pressure and the intake manifold pressure divided by either the exhaust manifold pressure or the intake manifold pressure. The value $\Delta P_{MAX}$, that is the maximum allowed magnitude of the differential pressure $\Delta P$, may be calculated in a variety of different ways. It will usually be a function of at least engine rpm $N_E$ and fuelling quantity, but for certain applications could be a simple constant value for all engine conditions.

In the described arrangement the switch 38 is actuated if the turbocharger rpm $N_T$ is greater than the maximum permitted turbocharger rpm. Alternatively the switch 38 could be actuated on the basis of the relative sizes of the two control signals S and $S_{NT}$. For a turbocharger where an increase in the control signal $S_{out}$ to the actuator causes a reduction in turbine area, and therefore an increase in turbocharger speed and intake manifold pressure, the output of the switch 38 will be selected always to correspond to whichever of the signals S and $S_{NT}$ is the smaller. If the relationship between the signal $S_{out}$ and the turbine area were reversed, then the output of the switch 38 would always be whichever of the signals S and $S_{NT}$ is the greater. The engine braking sub-circuit 20 in the illustrated arrangement is responsive to the engine speed and exhaust manifold pressure. It may also be responsive to variations in the ambient pressure, the ambient temperature, the intake manifold temperature and a driver demand signal.

With the described system, and still assuming an arrangement in which an increase in the control signal $S_{out}$ leads to a reduction in turbine inlet area, during normal steady-state or quasi-steady state operation the pressure differential across the engine will be positive or only slightly negative and certainly not enough to impair performance. Under these circumstances, the magnitude of the differential pressure $\Delta P$ will be less than $\Delta P_{MAX}$. Thus the switch 32 will deliver to its output the control signal $S_{P2}$. The system will thus operate to maintain a desired intake manifold pressure or density. If a sudden increase in demanded intake manifold pressure occurs, the intake manifold pressure sub-circuit 17 will act to increase the value of the control signal $S_{P2}$. This will cause both the intake manifold and exhaust manifold pressures to rise. If the transient is sufficiently severe and the different inertias of the intake and exhaust systems are such that the magnitude of the difference pressure $\Delta P$ rises to exceed the limit $\Delta P_{MAX}$, at this point the switch 32 will be actuated such that its output is connected to the signal $S_{\Delta P}$. In this mode of operation, the system will operate to control the turbocharger to maintain the differential pressure $\Delta P$ at the limit $\Delta P_{MAX}$. As the intake manifold pressure continues to rise it will approach the value of the exhaust manifold pressure, and in due course the switch 38 will return to its former condition. Depending on the application, it may be appropriate to introduce some hysteresis in the system to prevent unnecessarily frequent actuation of the switch 32.

Rather than control the switch 32 on the basis of the relative magnitudes of the signal $\Delta P$ and $\Delta P_{MAX}$, it may be controlled on the basis of the relative magnitudes of the signals $S_{\Delta P}$ and $S_{P2}$, the output of the switch 32 always corresponding to the lower of the signals $S_{P2}$ and $S_{\Delta P}$ for a turbocharger where an increase in control signal causes a reduction in turbine area.

Thus the circuit acts to maximize response of the air system and engine. During the initial phase of the transient, the intake manifold pressure monitoring circuit 17 acts to reduce the turbine area as quickly as possible to give a rapid rate of increase to the intake manifold pressure. If the exhaust pressure rises too far, however, that is to a point where the negative pressure differential across the engine (and hence the volumetric efficiency of the engine) would begin to fall significantly so as to cause a loss in performance, then the sub-circuit 18 assumes control to maintain the negative pressure differential at the optimum value $\Delta P_{MAX}$, which is chosen to allow the maximum rate of increase of the intake manifold pressure without significant loss of volumetric efficiency and load acceptance. As the transient continues and the intake manifold pressure (or density) rises towards its desired value, the negative pressure differential $\Delta P$ across the engine falls and the system then reverts to control in dependence upon the intake manifold pressure of the sub-circuit 17. The system then returns to a new steady state condition.

If the engine braking mode is selected by the driver, then the switch 40 is actuated and the variable geometry mechanism is then under the control of the engine braking sub-circuit 20. There is a known quantifiable relationship between engine braking power and exhaust manifold pressure, and it is therefore possible to control the engine braking power to the desired value. The system is under full closed loop control at all times, and it is possible therefore to drastically reduce the errors associated with conventional open loop control systems and to allow braking powers up to the maximum potentially available. The turbocharger speed sub-circuit 19 ensures that safe turbocharger rpms are never exceeded.

Although the described embodiments of the invention rely primarily upon direct pressure measurements and the calculation of differential pressures, as mentioned above, additional parameters may be monitored. In particular, it is believed that it may be possible to optimize performance by deriving outputs corresponding to gas densities rather than simply gas pressures by performing an appropriate calculation based upon the outputs of pressure measuring and temperature measuring transducers. With such an arrangement the monitored parameter would still be a function of the pressure but in addition would be a function of temperature.

Having thus described the invention, what is novel and desired to be secured by Letters Patent of The United States is:

What is claimed is:

1. A control system for a variable geometry turbocharger having a turbine driven by exhaust gas delivered to an exhaust gas inlet of the turbocharger from an engine exhaust manifold and a compressor driven by the turbine to deliver air to an engine intake manifold via an air outlet of the turbocharger, comprising sensor means for monitoring an engine operating parameter including at least a function of the pressure within the engine exhaust manifold, and closed loop control means receiving the output of said sensor means for controlling the displacement of a variable geometry mechanism located upstream of the turbine to maintain the monitored parameter within predetermined limits, wherein said monitored parameter is at least a function of the difference between the pressures within the engine exhaust manifold and the engine intake manifold.

2. A control system according to claim 1, wherein said closed loop control means comprises means for determining the difference in pressure between the engine exhaust and intake manifolds divided by the exhaust manifold pressure, whereby the monitored parameter is a function of the difference between the pressures within the engine exhaust manifold and the engine intake manifold divided by the pressure within the engine exhaust manifold.

3. A control system, also according to claim 1, wherein said closed loop control means comprises means for determining the difference in pressure between the engine exhaust and intake manifolds divided by the intake manifold pressure whereby the monitored parameter is a function of the difference between the pressures within the engine exhaust manifold and the engine intake manifold divided by the pressure within the engine intake manifold.

4. A control system according to claim 1, wherein the closed loop control means comprises means for fixing said predetermined limits.

5. A control system according to claim 1, wherein the predetermined limits are a function of at least engine speed and fuelling quantity.

6. A control system according to claim 1, comprising a first circuit for generating a first control signal to control the variable geometry mechanism to maintain a desired engine intake manifold pressure, a second circuit for generating a second control signal to control the variable geometry mechanism to maintain the said monitored parameter within the said predetermined limits, and a switch to selectively supply to the variable geometry mechanism the first signal if the predetermined limits are not reached and the second signal if the predetermined limits are reached.

7. A control system according to claim 6, comprising means for generating a third control signal to control the variable geometry mechanism to prevent the turbocharger speed exceeding a predetermined speed limit, and a switch for selectively applying the third control signal to the variable geometry mechanism if the predetermined speed limit is exceeded.

8. A control system according to claim 7, comprising means for generating a fourth control signal to control the variable geometry mechanism so as to provide a desired exhaust manifold pressure during engine braking, and a switch for selectively supplying the fourth signal to the variable geometry mechanism if the engine is in braking mode.

* * * * *